United States Patent
Kerdjoudj et al.

(10) Patent No.: US 6,465,915 B1
(45) Date of Patent: Oct. 15, 2002

(54) MINIATURIZED MOTOR

(75) Inventors: Mohamed Kerdjoudj, Chicago; A. N. Tsergas, Wood Dale, both of IL (US)

(73) Assignee: Molon Motor & Coil Corporation, Rolling Meadows, IL (US)

( * ) Notice: Subject to any disclaimer, the term of this patent is extended or adjusted under 35 U.S.C. 154(b) by 0 days.

(21) Appl. No.: 09/518,088

(22) Filed: Mar. 3, 2000

Related U.S. Application Data

(63) Continuation-in-part of application No. 09/315,852, filed on May 21, 1999, now Pat. No. 6,054,785.

(51) Int. Cl.$^7$ ............................................. H02K 7/10
(52) U.S. Cl. ..................................... 310/40 MM; 310/83
(58) Field of Search ........................... 310/40 MM, 75 R, 310/83, 89, 99; 221/81; 446/463, 489; 74/425, 421 A, 606 R; D13/122

(56) References Cited

U.S. PATENT DOCUMENTS

| | | | |
|---|---|---|---|
| 3,243,917 A | 4/1966 | Giammarino et al. | 446/446 |
| 3,486,271 A | 12/1969 | Feikema | 446/455 |
| 3,716,110 A | 2/1973 | Fonda | 180/405 |
| 3,747,265 A | 7/1973 | Gagnon | 446/425 |
| 3,772,825 A | 11/1973 | Gagnon | 446/425 |
| 3,810,515 A | 5/1974 | Ingro | 180/54.2 |
| 3,964,206 A | 6/1976 | Bernhard | 446/425 |
| 4,471,705 A * | 9/1984 | Takenoya et al. | 1123/254 |
| 4,565,538 A | 1/1986 | Kennedy et al. | 446/427 |
| 4,754,830 A | 7/1988 | Morishita et al. | 180/446 |
| 4,810,014 A * | 3/1989 | McGoarty et al. | 292/144 |
| 4,878,877 A * | 11/1989 | Auer et al. | 446/463 |
| 5,004,077 A | 4/1991 | Carlson et al. | 188/2 D |
| 5,172,605 A | 12/1992 | Schwartz | 74/421 A |
| 5,256,921 A * | 10/1993 | Pruis et al. | 310/68 B |
| 5,404,060 A | 4/1995 | Nakahashi et al. | 310/83 |
| 5,446,326 A | 8/1995 | Scheider | 310/83 |
| 5,734,210 A | 3/1998 | Keutz | 310/49 R |
| 5,737,968 A | 4/1998 | Hardey et al. | 74/425 |
| 5,747,903 A | 5/1998 | Klingler | 310/75 R |
| 5,791,514 A * | 8/1998 | Kirk, III et al. | 221/81 |
| 5,839,320 A | 11/1998 | Komachi | 74/421 A |
| 6,028,384 A | 2/2000 | Billman et al. | 310/83 |

FOREIGN PATENT DOCUMENTS

| | | |
|---|---|---|
| EP | 0 551 113 | 7/1993 |
| EP | 0 681 359 | 11/1995 |

* cited by examiner

*Primary Examiner*—Joseph Waks
(74) *Attorney, Agent, or Firm*—Oblon, Spivak, McClelland, Maier & Neustadt, P.C.

(57) ABSTRACT

A miniaturized motor includes a DC motor, a worm, a pinion gear, a worm gear, at least one cluster gear, an output gear and an output shaft. The gears form a gear train extending from the DC motor to the output shaft. A boss stabilizes the pinion gear by extending downwardly from inside the cover. Acoustical chambers packed with grease suppress noise generated by the gear train. A PC board is also provided on the cover to energize the DC motor. The output shaft may drive either a product mover for beverage cans inside a vending machine or another type of electromechanical unit requiring the application of high torque in a small space. A cradle bearing inside a cover holds a hub of the worm and prevents the worm from bending, thus assuring a good mesh of the worm with the pinion gear. A nest encapsulates the worm, the pinion gear and the worm gear to ensure protection and structural integrity of the miniaturized motor within the small space.

9 Claims, 4 Drawing Sheets

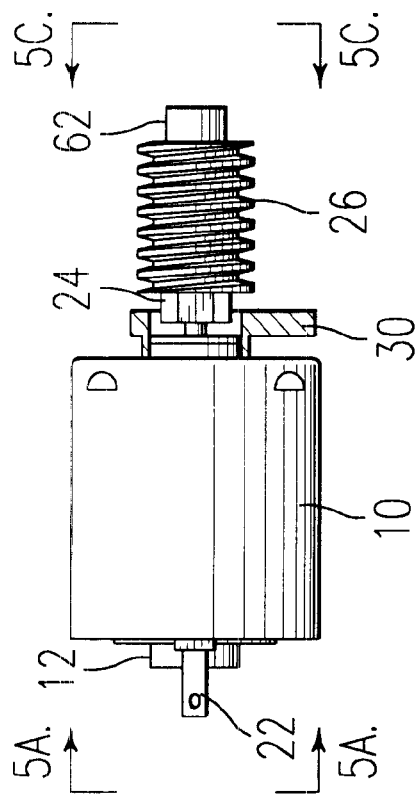
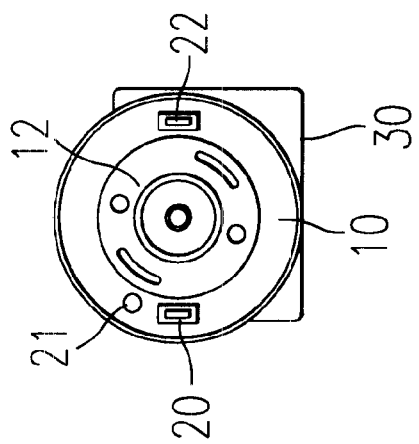

MINIATURIZED MOTOR

CROSS REFERENCE TO RELATED APPLICATIONS

This application is a continuation-in-part of U.S. Utility patent application Ser. No. 09/315,852, filed May 21, 1999 now U.S. Pat. No. 6,054,785, and is related to U.S. Design patent application Ser. No. 29/113,047, filed Oct. 29, 1999.

BACKGROUND OF THE INVENTION

1. Field of the Invention

This invention relates to machine elements and mechanisms generally, but more particularly to miniaturized motors.

2. Description of the Related Art

Existing designs for canned drink vending machine motors that operate at or above 100 inch-pounds are characterized by heavy duty shaded pole motors, zinc gear boxes, all metal gears with sleeve or needle bearings, and oversized installation envelopes.

In addition, the cost and weight for such designs are among the highest for subfractional horsepower gear motors. For example, present designs for vending machines include add-on brackets for custom mounting. Moreover, it is generally known that shaded pole motors are among the most inefficient types of motors in general use. Exemplary prior art devices are discussed below.

U.S. Pat. No. 5,446,326 issued to Scheider on Aug. 29, 1995, for a vending machine gear motor including a plastic gear box. As shown in FIG. 1 of his U.S. Patent, the gear motor of Scheider comprises a gear box 11 having a generally hollow plastic gear box housing 12, a gear train 14 mounted therein, and an electronically insulating cover 13.

U.S. Pat. No. 5,256,921 issued to Pruis et al. on Oct. 26, 1993, for a gear motor with a rotary switch. The gear motor has an output shaft for driving a dispensing mechanism of a vending machine. As shown in FIGS. 2 and 3 of their U.S. Patent, the gear motor of Pruis et al. includes an electric motor 12 mounted on a printed circuit board 13 and also includes an output shaft 14 which drives a conventional gear reduction unit 16.

U.S. Pat. No. 5,404,060 issued to Nakahashi et al. on Apr. 4, 1995, for a miniature motor with a worm reduction gear. The miniature motor includes a motor section 1 which transmits torque generated from a motor shaft 3 to a worm 4, then to a helical gear 5 in a reduction gear section 2, and eventually to an output shaft 6.

U.S. Pat. No. 5,172,605 issued to Schwartz on Dec. 22, 1992, and is assigned to the same assignee as the present invention. Schwartz discloses an electric motor gearbox for a vending machine. The gearbox has four main parts: a housing, a minimotor, a printed circuit board, and an assembly of plastic gears.

Various other gearing mechanisms relating to relatively small motors of general interest are disclosed in U.S. Pat. No. 5,747,903 issued to Klingler on May 5, 1998 and in U.S. Pat. No. 5,734,210 issued to Keutz on Mar. 31, 1998.

Despite these recent developments, it remains a problem in the prior art to develop a miniaturized motor with high torque for a gearcase which makes efficient use of space in a vending machine.

SUMMARY OF THE INVENTION

The present invention features unique improvements in the use of engineering plastics. The layout of components is compact, taking advantage of a direct current (DC) motor position which, in this particular case, is adjacent to a first-stage worm.

This arrangement keeps a miniaturized motor compact inside a gearbox which makes efficient use of space in a vending machine and in any other unit requiring an application of high torque in a small space.

A gear train within a gear box has standard available gears. However, the transfer stage from the worm down to a plurality of cluster gears within the gear box is flexibly arranged for a variety of gear ratios. This flexibility is introduced by adjusting the gear ratio between the first-stage worm with either single, double or quadruple threads and an adjacent pinion gear.

A metallic output shaft is supported directly within the gear box without introducing additional bearings. The lifetime of the gear box for directly supporting the output shaft is very predictable. Thus, this novel arrangement reduces costs over the lifetime of the gear box quite noticeably.

A number of features support quiet operation in addition to the first-stage worm. The gear box has close envelope contours to retain grease in the gear train. This close envelope also aids quiet operation. A plurality of acoustical chambers surround the gear train and insulate against noise transfer.

Unique to the present invention is the pinion gear that is supported by either a boss or a steel pin. Consequently, the invention provides a more stable gear mesh operation. Also, a cover supports the boss for the pinion gear at one end.

The rating of the gear motor can have a direct current (DC) voltage of either 12, 24, 36 or 48 volts. Furthermore, a printed circuit (PC) board is mounted on the gear box. A plastic cover provides a mounting post to support the PC board.

Materials for both the gear box and the cover are acrylonitrile butadinene styrene (ABS) copolymers or other engineering plastics with or without reinforcement in the matrix. Alternatively, metals may be used. However, they are not preferred because of their weight. Gears are made of delrin, nylon or other engineering plastics. Upper stage gears are formed from powdered metal or fine metallic blanks. Thus, the output shaft and other elements for transmitting torque are fabricated out of either powdered metal or metallic blanks.

Grease is selected from the high performance synthetic greases with a tolerance for both high and low temperatures. The poly-alpha-olefins have been found to be most satisfactory in this regard.

A key advantage of the present invention is that no anti-back-drive brake is necessary because of the use of the first-stage worm which typically cannot be back driven.

Thus, it is a primary object of the present invention to provide a vending machine with miniaturized motors that are compact, have noise control features, have higher efficiencies when compared to prior art devices, and are inexpensive to construct.

A secondary object of the present invention is to provide a miniaturized motor for custom mounting to a vending machine by direct foot mounts.

BRIEF DESCRIPTION OF THE DRAWINGS

A more complete appreciation of the invention and many of its attendant advantages will be readily obtained as the invention becomes better understood by reference to the following detailed description when considered with the accompanying drawings.

FIG. 5A is a rear end view of the DC motor, as seen along line 5A—5A of FIG. 5B.

FIG. 5B is a top plan view of the DC motor and the worm attached thereto.

FIG. 5C is an opposite end view of the worm and the DC motor attached therebehind, as seen along line 5C—5C of FIG. 5B.

DETAILED DESCRIPTION OF THE INVENTION

Figure 1:
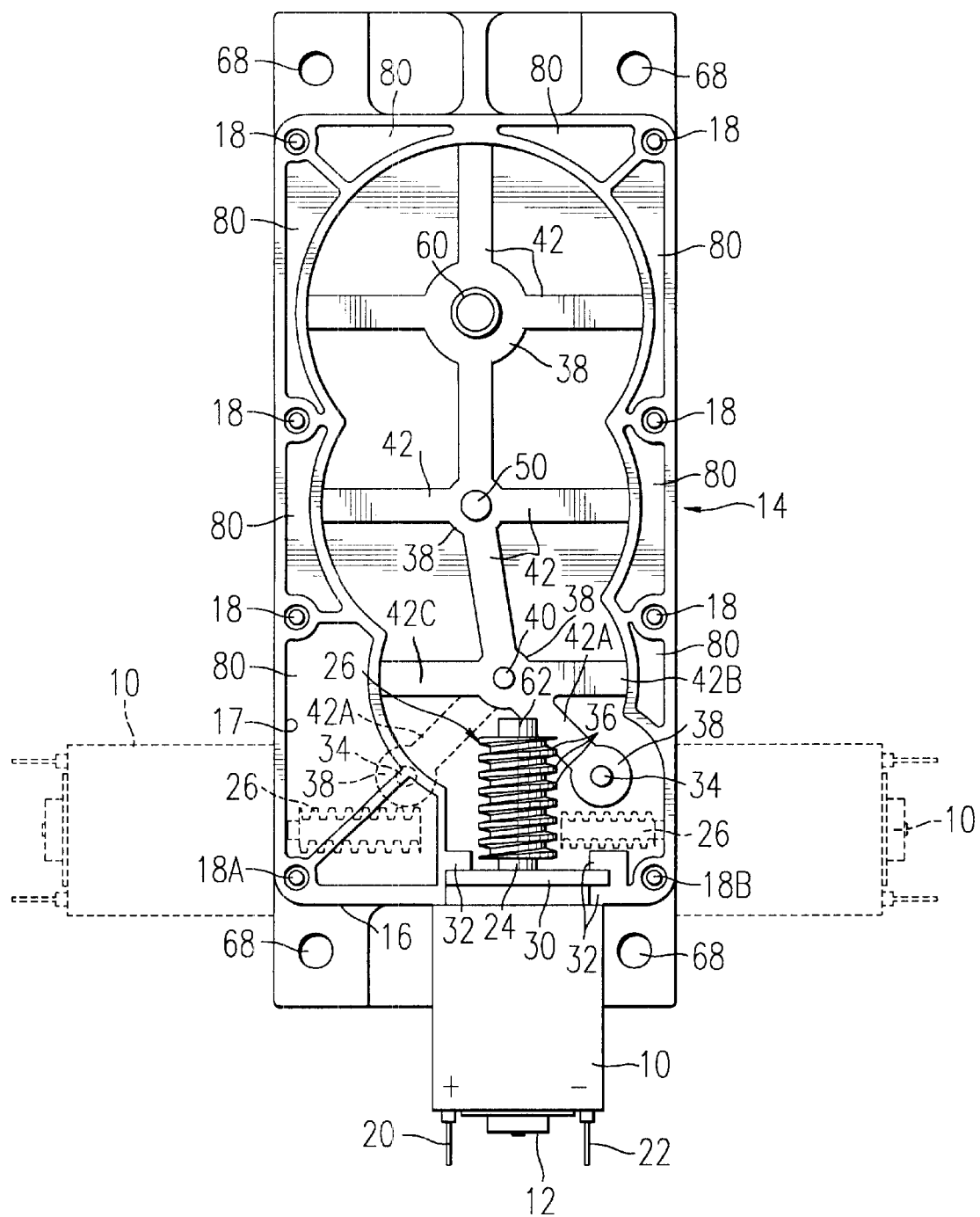
FIG. 1 is a top plan view of a miniaturized motor of the present invention with a gear train removed from inside a gear box.

Referring now to the drawings, like reference numerals designate identical or corresponding parts throughout the several views. Features of the invention will become apparent in the course of the following description of the preferred embodiment which is given only for illustration of the invention and which is not intended to limit its scope.

In FIG. 1, an internal permanent magnet 12 produces an electromagnetic field necessary for operating a DC motor 10 that is attached through an external wall 16 to a gear train inside a gear box 14. A plurality of short posts 18 interlock the gear box 14 to a cover (not shown in FIG. 1). Electricity is provided from an external power source (also not shown in FIG. 1) through a positive terminal 20 to the permanent magnet 12. A negative terminal 22 is fixed opposite to the positive terminal 20 on the DC motor 10. The permanent magnet 20 is energized inside the DC motor 10 to turn a rotary shaft hub 24 on which a first-stage worm 26 is mounted. Reversing the direction of rotation of the rotary shaft hub 24 and the first-stage worm 26 can be accomplished by reversing polarities of the DC voltage applied to the terminals 20 and 22. A support plate 30 holds the DC motor 10 and the worm 26 together on the rotary shaft hub 24. Side guides 32 surround peripheral edges of the support plate 30 so that the DC motor 10 and the worm 26 may slide together into and out of engagement with the external wall 16 of the gear box 14. The DC motor 10 and the worm 26 slide together with the support plate 30 in a plane perpendicular to the paper on which FIG. 1 is illustrated. Although the DC motor 10 and the worm 26 are shown in their preferred orientation in solid lines, they may also be rotated 90° either to the right or to the left, as seen in phantom lines. Teeth 36 on the worm 26 mesh with teeth of a pinion gear (not shown in FIG. 1) which is mounted on a pinion shaft 34. The worm 26 can be either single, double or quadruple threaded. Alternatively, the worm 26 can be helically threaded. The meshing of the various gears of the gear train will be described with reference to FIG. 2. However, for the sake of spatial orientation, there are shown in FIG. 1 the following: primary cluster gear shaft 40, secondary cluster gear shaft 50 and output shaft 60. Bosses 38 strengthen the gear box 14 where there are bores through which the shafts 34, 40, 50 and 60 pass. Because the shafts 34, 40, 50 and 60 are all made of metal, reinforcing ribs 42 radiate outwardly from each boss 38 to strengthen the gear box 14 further against cracking of the plastic material out of which the gear box 14 is molded. If the DC motor 10 and the worm 26 are essentially perpendicular to the shafts 40, 50 and 60, the shaft 34 with its surrounding boss 38 and its single radiating rib 42A are positioned at a 45° angle from a right horizontal rib 42B radiating from the shaft 40. The shaft 34, the boss 38 and the rib 42A are kept in the positions shown in solid lines for a second embodiment in which the DC motor 10 and the worm 26 (both shown in phantom lines on the right side of FIG. 1) are rotated 90° counterclockwise to form an L shape with the gear box 14. However, if the DC motor 10 and the worm 26 (both shown in phantom lines on the left side of FIG. 1) are rotated 90° clockwise to form a reversed L shape with the gear box 14, then the shaft 34, its surrounding boss 38 and the single radiating rib 42A are likewise rotated 90° so that they form a 45° angle with a left horizontal rib 42C radiating from the shaft 40. A plurality of extended corner feet 68 allows the gear box 14 to be custom mounted to a device being operated, e.g. a vending machine. Furthermore, any noise generated by the gear train is suppressed by grease packed inside a plurality of acoustical chambers 80 which are formed along side walls of the gear box 14.

Figure 2:
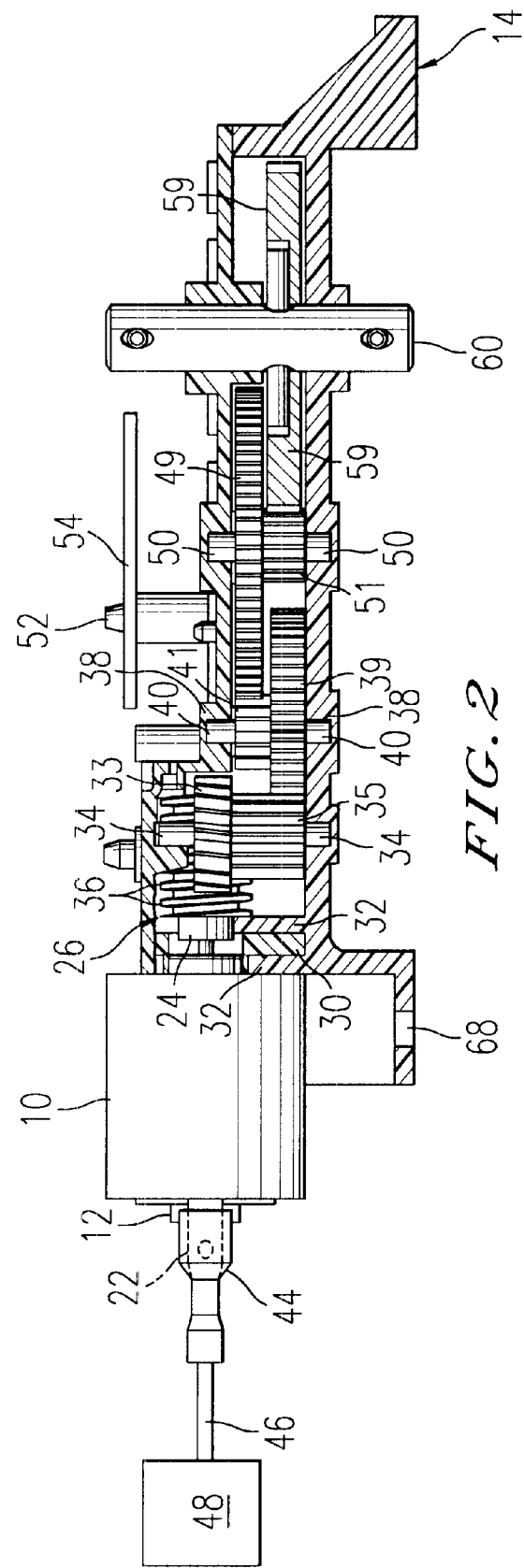
FIG. 2 is a right side elevational view of a DC motor attached to the gear train inside the gear box.

FIG. 2 is a partially cut away elevational view taken along the right side of FIG. 1. The DC motor 10 and its permanent magnet 12 are seen at the left side of FIG. 2. The negative terminal 22 is shown in phantom lines and has a clip 44 attached thereover. The clip 44 is connected to an end of a power line 46 which extends from an external power source 48 for either direct current (DC) or rectified alternating current (AC) with or without filtering. The foot 68 is one of four extended corner feet which allow the gear box 14 to be custom mounted to a vending machine being operated. At the right side of the DC motor 10, the rotary shaft hub 24 passes through the support plate 30 which is held in place by the side guides 32. The teeth 36 of the worm 26 drive an upper pinion gear 33 which is mounted on the pinion shaft 34 and which is formed integrally with a lower worm gear 35. Teeth of this worm gear 35 mesh with teeth of an adjacent primary cluster gear 39 which is mounted on the gear shaft 40. The worm 26, the pinion gear 33, the worm gear 35 and the primary cluster gear 39 are all made of hard plastic. A small metallic gear 41 sits on top of the primary cluster gear 39 and is press fitted into the center of the plastic gear 39 so that both gears 39 and 41 rotate together on the shaft 40. This shaft 40 is press fitted at both ends into centers of its surrounding bosses 38 and does not rotate itself. The small gear 41 drives a large adjacent upper secondary cluster gear 49 which rotates on the shaft 50. Below the gear 49, there is a small lower tertiary cluster gear 51 also mounted for rotation on the shaft 50. Thus, the gears 39, 41, 49 and 51 constitute a plurality of intermediate cluster gears. Above the plurality of cluster gears, there is a solid plastic post 52 molded integrally with the gear box 14 for supporting a printed circuit (PC) board 54 which energizes the DC motor 10. Teeth on the tertiary cluster gear 51 mesh with teeth on an output gear 59 to rotate the output shaft 60. The gears 41, 49, 51 and 59 are all made of sintered metal powder. Thus, the gears inside the gear box 14 change in composition from plastic at the beginning with the worm 26 to metal at the end with the output gear 59. This transition allows small plastic gears at the initiation of the drive sequence to turn large metallic gears at the output stage. The output shaft 60 drives either a product mover (not shown) for canned beverages inside a vending machine or any other electromechanical unit requiring the application of high torque in a small space.

Figure 3:
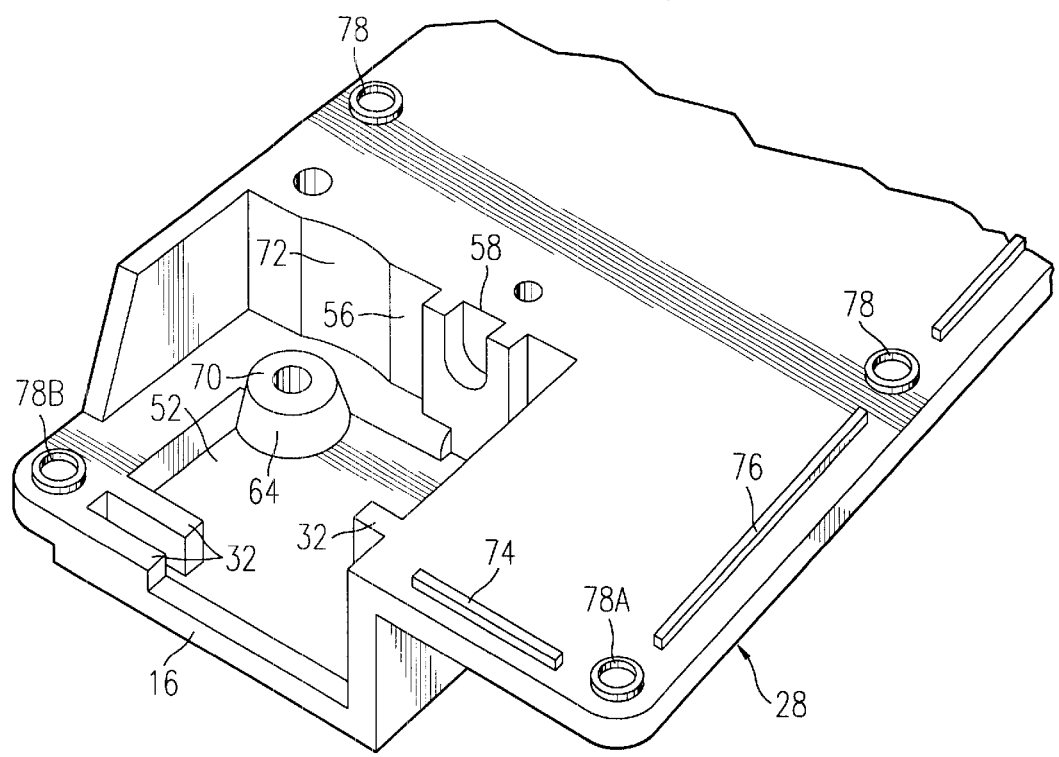
FIG. 3 is a perspective view of an underside of a top cover that nests over a worm.

In FIG. 3, a cover 28 for the gear box 14 illustrated in FIGS. 1 and 2 is shown partially broken away and flipped over so that the viewer is looking at the underside of the cover 28 in FIG. 3. The side guides 32 allow the support plate 30, which may be made of either metal or plastic, as shown in FIGS. 1 and 2, to hold the DC motor 10 securely outside the external wall 16 of FIG. 3 while simultaneously supporting the worm 26, the pinion gear 33 and the worm gear 35 of FIGS. 1 and 2 inside a nest 52 seen in FIG. 3. Thus, the side guides 32 allow the support plate 30 of FIGS. 1 and 2 to slide therebetween for a secured coupling of the worm 26 inside the nest 52 of FIG. 3. In one side wall 56 of the nest 52, there is formed integrally therewith a deep inset cradle bearing 58 for holding one hub 62 (see FIG. 1) of the worm 26 securely therein. When the hub 62 of the worm 26 is retained in the cradle bearing 58 of FIG. 3, the worm 26 of FIGS. 1 and 2 is prevented from bending during operation. A boss 64 seen in FIG. 3 is formed on a floor of the nest 52 and has a bore 70 in its top for receiving one end of the shaft 34, seen in FIGS. 1 and 2, with which the pinion gear 33 and the worm gear 35 rotate. Instead of the boss 64 of FIG. 3, a steel pin (not shown) may be used. When the cover 28 is placed on the gear box 14 of FIGS. 1 and 2, the boss 64 of FIG. 3 extends downwardly from the cover 28. The one side wall 56 also has a scalloped portion 72 for accommodating a curved periphery of the pinion gear 33 of FIGS. 1 and 2 as the pinion gear 33 rotates. The cover 28 of FIG. 3 likewise has a plurality of rings 78 which interlock over tops of the plurality of short posts 18 seen in FIG. 1. To show how the cover 28 of FIG. 3 fits over the gear box 14 in FIG. 1, note that rings 78A and 78B of FIG. 3 mate with short posts 18A and 18B, respectively, in FIG. 1. Also, short rib 74 and long rib 76 of FIG. 3 fit inside external walls 16 and 17 of the gear box 14 in FIG. 1. Other ribs on the broken away section of the cover 28 are not shown in FIG. 3 for the sake of simplicity.

Figure 4:
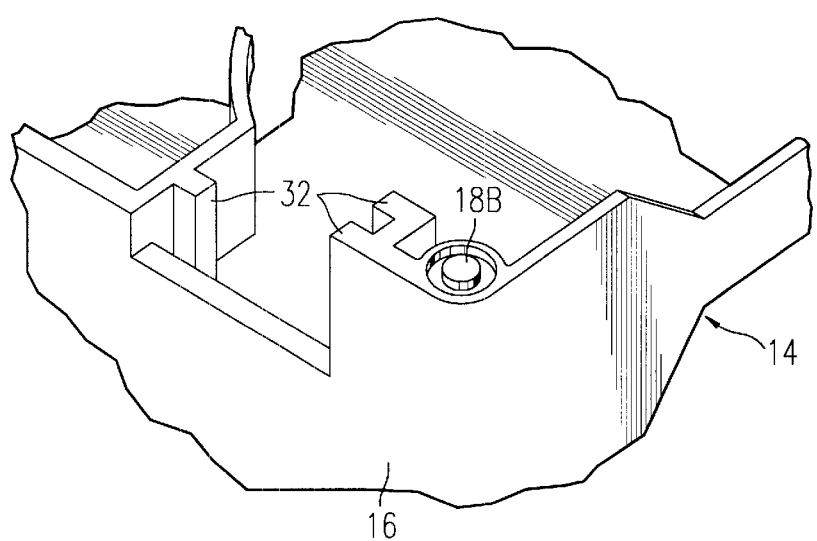
FIG. 4 is a perspective view of a right corner of the gear box in which the worm is set.

In FIG. 4, there is a partially broken away perspective view of the gear box 14 with a close-up detailed illustration of the lower right corner over which the nest 52 of FIG. 3 sits. In FIG. 4, there is the short post 18B on which the ring 78B of the cover 28 in FIG. 3 fits. Also, in FIG. 4, inside the external wall 16, the side guides 32 hold the peripheral edges of the support plate 30 of FIGS. 1 and 2. After the cover 28 of FIG. 3 is flipped over and placed on top of the gear box 14 of FIG. 4, the entire assembly is closed tightly and sealed by ultrasonic welding.

In FIG. 5A, there is an end view of the DC motor 10 and its permanent magnet 12 taken along line 5A—5A of FIG. 5B. The positive terminal 20 and the negative terminal 22 are secured on opposite sides along a periphery of the DC motor 10. A circular red marker 21 identifies the positive terminal 20 for a user. The support plate 30 can be seen behind the DC motor 10 in FIG. 5A.

In FIG. 5B, there is a side elevational view of the DC motor 10 with its permanent magnet 12 and the negative terminal 22 illustrated at the left side. At the right side of FIG. 5B, there are the support plate 30, the shaft hub 24, the worm 26, and the hub 62 which sits in the cradle bearing 58 of FIG. 3.

FIG. 5C is an opposite end view taken along line 5C—5C of FIG. 5B. In FIG. 5C, there is seen the hub 62, the worm 26, the support plate 30 and the DC motor 10 therebehind. A pair of screws 23 fasten the support plate 30 to the DC motor 10 so that the DC motor 10 and the worm 26 remain connected together in a straight line during rotation of the worm 26.

Numerous modifications and variations of the present invention are possible in light of the above teachings. Thus, it is to be understood that, within the scope of the appended claims, the invention may be practiced otherwise than as specifically described herein.

What is claimed is:

1. A miniaturized motor, comprising:

a DC motor with a permanent magnet attached thereto;

a first-stage worm driven at one end by the DC motor;

a pinion gear engaging with the first-stage worm;

a worm gear formed integrally with the pinion gear;

at least one cluster gear engaging with the worm gear;

an output gear driven by the at least one cluster gear;

an output shaft connected with the output gear;

a cover configured to protect a gear train;

a gear box configured to contain the gear train;

a boss connected at one end to the cover and configured to stabilize the pinion gear; and a cradle bearing formed in the cover and configured to receive one shaft end of the first-stage worm in order to prevent the first-stage worm from bending during operation;

whereby the first-stage worm, the pinion gear, the worm gear, the at least one cluster gear and the output gear form the gear train.

2. A miniaturized motor, according to claim 1, further comprising:

a support plate connected between the DC motor and the first-stage worm.

3. A miniaturized motor, according to claim 2, further comprising:

a device configured to fasten the support plate to the DC motor so that the DC motor and the first-stage worm remain connected together in a straight line during rotation of the first-stage worm.

4. A miniaturized motor, according to claim 2, further comprising:

side guides formed in the cover and in the gear box and configured to allow the support plate to slide therein for a secured coupling of the DC motor and the first-stage worm.

5. A miniaturized motor, according to claim 1, further comprising:

a PC board attached to the cover.

6. A miniaturized motor, according to claim 1, further comprising:

a nest provided inside the cover and configured to support the first-stage worm, the pinion gear and the worm gear therein.

7. A miniaturized motor, according to claim 1, wherein:

said DC motor is positioned at a 90° angle to the gear box to form one of an L shape and a reversed L shape therewith.

8. A miniaturized motor, according to claim 1, further comprising:

a plurality of acoustical chambers formed along side walls of the gear box.

9. A miniaturized motor, according to claim 1, further comprising:

a pinion shaft mounted below the pinion gear and above the worm gear.

* * * * *

UNITED STATES PATENT AND TRADEMARK OFFICE
CERTIFICATE OF CORRECTION

PATENT NO. : 6,465,915 B1 Page 1 of 1
DATED : October 15, 2002
INVENTOR(S) : Mohamed Kerdjoudj et al.

It is certified that error appears in the above-identified patent and that said Letters Patent is hereby corrected as shown below:

<u>Title page,</u>
Item [57], ABSTRACT,
Line 6, delete "packed with grease".

<u>Column 1,</u>
Lines 6 and 8, change "patent application" to -- Patent Application --.

<u>Column 2,</u>
Line 5, change "gearbox" to -- tight volume --.

<u>Column 3,</u>
Line 8, change "comer" to -- corner --.

<u>Column 4,</u>
Line 18, delete "grease packed inside".

Signed and Sealed this

Twenty-first Day of January, 2003

JAMES E. ROGAN
*Director of the United States Patent and Trademark Office*